US007939207B2

(12) United States Patent
Nishida et al.

(10) Patent No.: US 7,939,207 B2
(45) Date of Patent: May 10, 2011

(54) NON-AQUEOUS ELECTROLYTE LITHIUM ION SECONDARY CELL WITH IMPROVED CYCLE CHARACTERISTICS AND METHOD FOR FABRICATING THE SAME

(75) Inventors: Nobumichi Nishida, Tokushima (JP); Shinya Miyazaki, Naruto (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 992 days.

(21) Appl. No.: 11/010,384

(22) Filed: Dec. 14, 2004

(65) Prior Publication Data

US 2005/0147892 A1 Jul. 7, 2005

(30) Foreign Application Priority Data

Dec. 18, 2003 (JP) .................................. 2003-420834

(51) Int. Cl.
*H01M 6/16* (2006.01)
(52) U.S. Cl. .................. 429/326; 429/231.5; 429/231.6; 429/231.3; 429/332
(58) Field of Classification Search .................. 429/326, 429/332, 231.3, 231.5, 231.6
See application file for complete search history.

(56) References Cited

U.S. PATENT DOCUMENTS

| 4,753,859 A | * | 6/1988 | Brand et al. ................... 429/331 |
| 5,478,673 A | * | 12/1995 | Funatsu ......................... 429/331 |
| 6,153,338 A | | 11/2000 | Gan et al. |
| 6,368,750 B1 | | 4/2002 | Nemoto et al. |
| 6,395,426 B1 | | 5/2002 | Imachi et al. |
| 6,534,216 B1 | * | 3/2003 | Narukawa et al. ............. 429/224 |
| 2002/0127175 A1 | * | 9/2002 | Gao et al. ....................... 423/594 |
| 2002/0168574 A1 | * | 11/2002 | Ahn et al. ...................... 429/232 |
| 2003/0054259 A1 | | 3/2003 | Murai et al. |
| 2003/0124434 A1 | * | 7/2003 | Gan et al. ....................... 429/326 |
| 2003/0152840 A1 | * | 8/2003 | Song et al. .................... 429/338 |
| 2004/0146775 A1 | | 7/2004 | Yoshizawa et al. |

FOREIGN PATENT DOCUMENTS

| CN | 1398013 A | | 2/2003 |
| JP | 04-319260 A | | 11/1992 |
| JP | 06-168722 A | | 6/1994 |
| JP | 06-325791 A | | 11/1994 |
| JP | 07029601 A | | 1/1995 |
| JP | 11086904 A | * | 3/1999 |
| JP | 2000090933 A | | 3/2000 |
| JP | 2000-200605 A | | 7/2000 |
| JP | 2001-068167 A | | 3/2001 |
| JP | 2002117898 A | | 4/2002 |
| JP | 2002-208401 A | | 7/2002 |
| JP | 2004228045 A | | 8/2004 |

* cited by examiner

*Primary Examiner* — Dah-Wei D Yuan
*Assistant Examiner* — Zachary Best
(74) *Attorney, Agent, or Firm* — Westerman, Hattori, Daniels & Adrian, LLP

(57) ABSTRACT

The present invention improves the cycle characteristics of a non-aqueous electrolyte secondary cell that uses lithium cobalt oxide as a positive electrode active material. To this end, an element different from cobalt such as zirconium and titanium is added to the lithium cobalt oxide, acting as the positive electrode active material. The non-aqueous electrolyte contains a non-aqueous solvent containing diethyl carbonate at 10 to 30 volume percent on a base of 25 degree Celsius and contains an electrolyte salt.

27 Claims, No Drawings

NON-AQUEOUS ELECTROLYTE LITHIUM ION SECONDARY CELL WITH IMPROVED CYCLE CHARACTERISTICS AND METHOD FOR FABRICATING THE SAME

BACKGROUND OF THE INVENTION

1) Field of the Invention

The present invention relates to the improvement of the cycle characteristics of non-aqueous electrolyte secondary cells and batteries.

2) Description of the Related Art

Non-aqueous electrolyte secondary cells represented by lithium ion secondary cells have a high energy density and a high capacity, and as such are useful for the power sources for driving mobile information terminals. As the mobile information terminals have become more and more multifunctional, such cells are required to have still higher capacity.

As the positive electrode active material for the non-aqueous electrolyte secondary cells, lithium cobalt oxide ($LiCoO_2$) is often used for its high cell capacity and excellent charge and discharge characteristics. However, when used alone, the lithium cobalt oxide may not show sufficient thermal stability and cycle characteristics. In view of this there have been proposed techniques of adding to the lithium cobalt oxide different metal elements such as Ti, Zr, Mg, and Al. Such techniques are described in Patent Documents 1 to 6.

Patent Document 1: Japanese Unexamined Patent Application Publication No. 2000-200605 (Abstract)

Patent Document 2: Japanese Unexamined Patent Application Publication No. 6-325791 (pages 2 to 3)

Patent Document 3: Japanese Unexamined Patent Application Publication No. 4-319260 (Abstract)

Patent Document 4: Japanese Unexamined Patent Application Publication No. 2002-208401 (Abstract)

Patent Document 5: Japanese Unexamined Patent Application Publication No. 6-168722 (Abstract)

Patent Document 6: Japanese Unexamined Patent Application Publication No. 2001-68167 (Abstract)

i) Patent Document 1 discloses the use of a non-aqueous electrolyte containing propylene carbonate and LiN$(SO_2C_2F_5)_2$ as the electrolyte salt, a graphite negative electrode, and $LiCoO_2$ containing Ti as the positive electrode material in which titanium particles and/or titanium compound particles are attached on the surfaces of the lithium cobalt oxide particles. The mole ratio of the titanium particles and/or titanium compound particles to the lithium cobalt oxide is 0.00001 to 0.02. Here, the titanium particles serve to decompose a coating film that results from the non-aqueous solvent (in such a manner that the film encompasses the positive electrode active material), or serve to promote the removal of the coating film. This inhibits the deterioration of discharge characteristics resulting from faulty ion conductivity. As a result, this document claims that a significant drop in the discharge capacity at the time of operation under low temperatures is alleviated.

ii) Patent Document 2 discloses a positive electrode active material that is mainly composed of first-particle-agglomerations (second particles) having an average diameter of 0.1 μm to 15 μm. The first-particle-agglomerations are composed of first particles having an average diameter of 0.01 μm to 5.0 μm. Also, the positive electrode active material comprises $Li_xM_{y1}N_{y2}O_2$ (M representing a Co, Ni, or V atom; N representing a Ni, V, Fe, Mn, Ti, B, or P atom; x=0.1 to 1.5, y1=0.8 to 1.4, y2=0 to 0.5, and z=1.90 to 4.2). It is claimed that by controlling the particle diameters the resulting non-aqueous secondary cell is provided with preferable application characteristics and preferable charge and discharge characteristics, and further, preferable self-discharge characteristics are provided.

iii) Patent Document 3 discloses the use of a lithium cobalt oxide to which zirconium is added. Here, the surfaces of the lithium cobalt oxide particles are covered with zirconium oxide or a compound oxide of the lithium and zirconium, and thus are stabilized. The document claims that this eliminates the decomposition reaction of the electrolyte and crystal defects even at a high potential, thus realizing excellent cycle characteristics and excellent preservation characteristics.

iv) Patent Document 4 discloses the use of a positive electrode active material that is composed of a lithium-containing transition metal compound oxide. This oxide is substantially represented by the formula $Li_xT_yM_zO_2$ (where T represents at least one element selected from the transition metals; M represents at least one element selected from the group consisting of Mg, Al, Si, Ti, Zn, Zr, and Sn; $0.9 \leq x \leq 1.15$, $0.85 \leq y \leq 1.00$, and $0 < z \leq 0.1$). Here, the particle diameters can be made fine by calcination under the normal conditions. As a result, this document claims to realize an excellent cell capacity, excellent charge and discharge characteristics, and excellent temperature characteristics (especially those of low-temperature), in accordance with the fine particle diameters, the sphericalness of the particles, and sharpness of particle distribution.

v) Patent Document 5 discloses the use of, as the positive electrode active material, $LiMg_xCo_{1-x}O_{2-y}$ ($0<x<1$, $0<y<0.5$, and x=2y). Compared with $LiCoO_2$, this substance excels in electron conductivity at normal temperature, thus improving the cell performance.

vi) Patent Document 6 discloses a non-aqueous electrolyte cell in which a power generating element composed of a positive and a negative electrodes and the electrolyte are housed in an outer casing. The outer casing can be deformed by only a slight increase in the internal pressure, and the electrolyte is one of gelled polymer in which a solid polymer, an electrolyte salt, and an electrolytic solution are gelled. Further, the positive electrode active material is a lithium-containing compound oxide represented by the formula $LiCo_{1-x}Zr_xO_2$ ($0<x \leq 0.1$). Such a structure inhibits the decomposition of the solvent and electrolyte salt, and thus inhibits gas generation within the cell. As a result, it is claimed that cell dilation is hard to occur even though the outer casing is susceptible to a slight increase in the internal pressure.

When, in accordance with the above techniques, a lithium cobalt oxide is used as the positive electrode active material to which an element different from cobalt is added, the electrolyte can be decomposed through the charge and discharge cycles and the amount thereof is decreased. In addition, the products resulting from the decomposition cause to increase the internal resistance, thus aggravating the cycle characteristics. This aggravation caused by the decomposed electrolyte becomes especially notable when the amount of the active material is increased and that of the electrolyte is decreased, in the hope of enhancing the cell capacity. Thus, the cell capacity cannot be enhanced sufficiently without compromising the cycle characteristics.

SUMMARY OF THE INVENTION

An extensive study carried out by the present inventors aimed at solving the above problems has found the following findings in respect to a non-aqueous electrolyte secondary cell that contains as the positive electrode active material a lithium cobalt oxide to which an element different from cobalt is added. For the non-aqueous solvent, which constitutes the non-aqueous electrolyte, open-chain carbonates containing a methyl group (e.g., dimethyl carbonate (DMC) and methyl ethyl carbonate (MEC)) are easily decomposed, and this decomposition is inhibited by adding a certain amount of an open-chain carbonate (diethyl carbonate (DEC)) with no methyl group contained.

The present invention has been accomplished based on these findings, and it is an object of the present invention to provide a non-aqueous electrolyte secondary cell that has a high capacity and excels in the cycle characteristics.

This object is achieved by the following structures of the present invention that improve the structural stability of the crystal of the lithium cobalt oxide and inhibit the decomposition of the electrolyte.

1) There is provided a non-aqueous electrolyte secondary cell comprising: a negative electrode; a positive electrode having a positive electrode active material containing a different-element-added lithium cobalt oxide having added thereto an element different from cobalt; and a non-aqueous electrolyte containing a non-aqueous solvent and an electrolyte salt, the cell wherein, the non-aqueous solvent contains diethyl carbonate at 10 to 30 volume percent on a base of 25 degree Celsius.

2) The element different from cobalt may be at least one of Ti and Zr.

3) The element different from cobalt may be at least one of Mg and Al.

4) The amount of the electrolyte may be equal to or less than 0.32 ml per one gram of the positive electrode active material.

The advantageous effects of the above structures will be described below.

With the structure in which an element different from cobalt is added to the lithium cobalt oxide, the reaction resistance thereof is decreased, thus improving the structural stability of the crystal of the lithium cobalt oxide. As a result, the cell is provided with excellent low-temperature characteristics and excellent load characteristics.

The diethyl carbonate (DEC) inhibits the decomposition and deterioration of the methyl ethyl carbonate (MEC) and dimethyl carbonate (DMC), thus drastically improving the cycle characteristics.

If the content of the DEC is less than 10 volume percent, the MEC and DMC cannot be sufficiently kept from the decomposition reaction. If the DEC content is greater than 30 volume percent, since DEC is more viscous than MEC and DMC, the electrode plates become less readily impregnated with the electrolyte, and the contact between the electrolyte and the electrode plates becomes poor, resulting in deterioration of the load characteristics and low-temperature characteristics. In view of this, the DEC content is preferably 10 to 30 volume percent on a base of 25 degree Celsius.

When the element different from cobalt is at least one of Ti and/or Zr, the cycle characteristics and low-temperature discharge characteristics are greatly improved.

When the element different from cobalt is at least one of Mg and/or Al, the thermal stability of the lithium cobalt oxide is drastically improved, as well as improving the cycle characteristics and low-temperature discharge characteristics.

The adverse effects caused by decomposition of the electrolyte are most notable when the amount thereof is equal to or less than 0.32 ml per one gram of the positive electrode active material. However, the present invention, in which diethyl carbonate (DEC) is contained at 10 to 30 volume percent, curbs the decomposition of the electrolyte. Accordingly, the present invention realizes a cell of high capacity and excellent cycle characteristics.

DESCRIPTION OF THE PREFERRED EMBODIMENTS

Preferred embodiments of the present invention will now be described in detail according to Examples. It will be appreciated that the present invention is not to be limited by these embodiments, and that amendments and modifications are possible without departing from the scope of the invention.

Example 1

Preparation of the Positive Electrode

Zirconium (Zr) and cobalt (Co) were coprecipitated such that the zirconium would be 0.2 mol % per 1 mol of the cobalt, so that zirconium-added tricobalt tetraoxide ($Co_3O_4$) was prepared by a thermal decomposition reaction. Then, $CO_3O_4$ was mixed with lithium carbonate and calcined at 850° C. for 20 hours, thus preparing a positive electrode active material made of zirconium-added lithium cobalt oxide ($LiCoO_2$).

Then, an active material slurry was obtained by mixing 94 parts by mass of this positive electrode active material, 3 parts by mass of a carbon-based conductivity enhancer made of acetylene black, 3 parts by mass of a binder made of polyvinylidene fluoride (PVdF), and N-methyl-2-pyrrolidone (NMP).

This active material slurry was uniformly applied on both sides of a positive electrode substrate made of an aluminum foil of 15 μm thick by a doctor blade, and then was dried by passing it through the inside of a heating dryer. By this drying step, the organic solvent required in the step of preparing the slurry was removed. Thus, an electrode plate was prepared. Subsequently, the electrode plate was rolled with a roll press machine to a thickness of 0.15 mm, and cut into a size of 36.5 mm×310 mm, thus preparing a positive electrode.

Preparation of the Negative Electrode

An active material slurry was obtained by mixing 95 parts by mass of a negative electrode active material made of graphite, 3 parts by mass of a thickener made of carboxymethyl cellulose, 2 parts by mass of a binder made of styrene-butadiene rubber, and a right amount of water. This active material slurry was uniformly applied on both sides of a negative electrode substrate made of a copper foil of 8 μm thick by a doctor blade, and then was dried by passing it through the inside of a heating dryer. By this drying step, the water required in the step of preparing the slurry was removed. Thus, an electrode plate was prepared. Subsequently, the electrode plate was rolled with a roll press machine to a thickness of 0.135 mm, and cut into a size of 37.5 mm×325 mm, thus preparing a negative electrode.

Preparation of the Electrode Assembly

The positive and negative electrodes were wound with a separator made of finely porous film of polyethylene and provided between the electrodes, thus preparing a flatly wound electrode assembly.

Preparation of the Electrolyte

Ethylene carbonate, methyl ethyl carbonate, and diethyl carbonate were mixed at a volume ratio of 30:50:20, respectively (at a temperature of 25° C.) thus preparing a non-aqueous solvent mixture. Into this mixture was dissolved 1M (mol/l) of $LiPF_6$ thus preparing an electrolyte.

The above prepared electrode assembly was inserted into an outer casing (5×34×43 mm), which was then impregnated with the electrolyte. Then, the opening of the outer casing was sealed, thus obtaining a cell according to Example 1.

The term electrolyte used herein is intended to encompass the electrolytic solution.

Examples 2 to 9, Comparative Examples 1 to 9

Cells were prepared in the same manner as in Example 1 except for changes made to the elements different from cobalt to be added to the lithium cobalt oxide, to the amount of the elements, and to the composition ratio of the non-aqueous solvent, as shown in Table 1.

Experiment 1

The cells prepared above were charged and discharged under the conditions given later to check the cycle characteristics, load characteristics, and low-temperature characteristics. Also, the average of the voltages between the commencement and termination of the discharge was measured. The test conditions are as follows and the test results are listed in Table 1.

Cycle Characteristics Test
Charge conditions: constant current 1.43 It (1000 mA), constant Voltage 4.2 V, termination current 14 mA, temperature 25° C.
Discharge conditions: constant current 1 It (700 mA), termination voltage 3.10 V, temperature 25° C.
Cycle characteristics (cycle capacity retention rate) (%): (500th-cycle discharge capacity÷1st-cycle discharge capacity)×100.
Load Characteristics Test
Load discharge conditions: constant current 2.5 It (1750 mA), termination voltage 2.75 V, temperature 25° C.
Load characteristics (load characteristics capacity retention rate) (%): (load discharge capacity÷1 It discharge capacity)×100.
Low-Temperature Characteristics Test
Low-temperature discharge conditions: constant current 1It (700 mA), termination voltage 2.75 V, temperature −20° C.
Low-temperature characteristics (low-temperature discharge capacity retention rate) (%): (low-temperature discharge capacity÷discharge capacity at 25° C.)×100.

TABLE 1

| | element added (mol %) | non-aqueous solvent (volume ratio) | load characteristics | | low-temp. characteristics | | cycle characteristics | |
|---|---|---|---|---|---|---|---|---|
| | | | capacity retention rate (%) | average voltage (V) | capacity retention rate (%) | average voltage (V) | capacity retention rate (%) | average voltage (V) |
| C.E.1 | — | EC:MEC = 30:70 | 53 | 3.56 | 22 | 3.09 | 73 | 3.43 |
| C.E.2 | — | EC:MEC:DEC = 30:50:20 | 50 | 3.55 | 20 | 3.08 | 72 | 3.43 |
| C.E.3 | Zr: 0.2 | EC:MEC = 30:70 | 70 | 3.60 | 35 | 3.20 | 50 | 3.48 |
| E.1 | Zr: 0.2 | EC:MEC:DEC = 30:50:20 | 65 | 3.58 | 31 | 3.17 | 87 | 3.65 |
| C.E.4 | Zr: 0.2 | EC:MEC:DEC = 30:65:5 | 70 | 3.60 | 33 | 3.19 | 55 | 3.50 |
| E.2 | Zr: 0.2 | EC:MEC:DEC = 30:60:10 | 68 | 3.60 | 32 | 3.19 | 85 | 3.65 |
| E.3 | Zr: 0.2 | EC:MEC:DEC = 30:40:30 | 65 | 3.58 | 30 | 3.17 | 86 | 3.65 |
| C.E.5 | Zr: 0.2 | EC:MEC:DEC = 30:35:35 | 50 | 3.56 | 19 | 3.10 | 85 | 3.63 |
| C.E.6 | Zr: 0.2 | EC:MEC:DEC = 30:20:50 | 40 | 3.53 | 15 | 3.09 | 86 | 3.63 |
| C.E.7 | Ti: 0.2 | EC:MEC = 30:70 | 78 | 3.63 | 38 | 3.25 | 34 | 3.4 |
| E.4 | Ti: 0.2 | EC:MEC:DEC = 30:50:20 | 75 | 3.63 | 35 | 3.22 | 88 | 3.66 |
| C.E.8 | Zr: 0.2 | PC:EC:MEC = 10:20:70 | 69 | 3.61 | 40 | 3.24 | 49 | 3.47 |
| E.5 | Zr: 0.2 | PC:EC:MEC:DEC = 10:20:50:20 | 64 | 3.58 | 36 | 3.21 | 86 | 3.66 |
| C.E.9 | Zr: 0.2 | EC:DMC = 30:70 | 74 | 3.63 | 40 | 3.26 | 30 | 3.27 |
| E.6 | Zr: 0.2 | EC:DMC:DEC = 30:50:20 | 70 | 3.62 | 36 | 3.23 | 87 | 3.64 |
| E.7 | Zr: 0.2, Mg: 1, Al: 1 | EC:MEC:DEC = 30:50:20 | 63 | 3.57 | 30 | 3.15 | 88 | 3.63 |
| E.8 | Ti: 0.2, Mg: 1, Al: 1 | EC:MEC:DEC = 30:50:20 | 73 | 3.61 | 33 | 3.2 | 87 | 3.65 |

TABLE 1-continued

|  | non-aqueous | load characteristics | | low-temp. characteristics | | cycle characteristics | |
|---|---|---|---|---|---|---|---|
| element added (mol %) | solvent (volume ratio) | capacity retention rate (%) | average voltage (V) | capacity retention rate (%) | average voltage (V) | capacity retention rate (%) | average voltage (V) |
| E.9 Zr: 0.1, Ti: 0.2, Mg: 1, Al: 1 | EC:MEC:DEC = 30:50:20 | 70 | 3.60 | 32 | 3.18 | 87 | 3.63 |

EC: ethylene carbonate,
PC: propylene carbonate,
MEC: methyl ethyl carbonate,
DMC: dimethyl carbonate,
DEC: diethyl carbonate Table 1 shows that the cells of Example 1 and Comparative Example 3, in which addition of zirconium was performed, had load capacity retention rates of 65% and 70%, respectively, and low-temperature capacity retention rates of 31% and 35%, respectively. On the other hand, the cells of Comparative Examples 1 and 2, in which no zirconium was added, had load capacity retention rates of 53% and 50%, respectively, and low-temperature capacity retention rates of 20% and 22%, respectively. The load and low-temperature capacity retention rates were better in Example 1 and Comparative Example 3 than in Comparative Examples 1 and 2.

The cycle capacity retention rates of the cells of Comparative Examples 1 and 2, in which zirconium was not added, were 73% and 72%, respectively. On the other hand, the cells of Example 1 and Comparative Example 3, in which zirconium was added, showed a large difference in the cycle characteristics, 87% (DEC added) and 50% (no DEC), respectively, depending on the presence of diethyl carbonate (DEC).

To detect the cause of this difference the cells of Example 1 and Comparative Examples 1 to 3 were disassembled after they had been subjected to the cycle characteristics tests, in order to analyze the electrolytes and the active materials. The analysis revealed that in the cell of Comparative Example 3 the decomposition of the electrolyte was notable. Thus, the diminished cycle capacity retention rate of the cell of Comparative Example 3 is considered to have been caused by the decrease in the amount of the electrolyte, which contributes to the charge and discharge, and by an increase in the internal resistance resulting from the decomposition products.

In the cells of Comparative Examples 1 and 2, with no zirconium contained, there was little decomposition of the electrolyte, but significant deterioration was found in the crystal structure of the lithium cobalt oxide, an active material. Thus, the diminished cycle capacity retention rates of the cells of Comparative Examples 1 and 2 are considered to have been caused by the deterioration of the active material.

In the cell of Example 1, there was no deterioration of the active material and no decomposition of the electrolyte. These results show that it is preferable to add to the positive electrode an element (Zr) different from cobalt and to contain in the electrolyte diethyl carbonate (DEC).

A comparison between the cells of Examples 1 to 3 and Comparative Examples 4 to 6, in which the amounts of the diethyl carbonate were varied, showed the following results. In the case where the diethyl carbonate was between 10 vol % and 30 vol %, the cycle capacity retention rate was 85% to 87% and the low-temperature capacity retention rate was 30% to 32%; thus, both cycle and low-temperature capacity retention rates were excellent. On the other hand, the cell of Comparative Example 4, in which the diethyl carbonate was 5 vol %, had a cycle capacity retention rate of 55%, and the cells of Comparative Examples 5 and 6, containing the diethyl carbonate at 35 vol % and more, exhibited diminished low-temperature capacity retention rates of 19% and 15%, respectively. In addition, compared with the cells of Examples 1 to 3 showing load capacity retention rates of 65% and 68%, those of the cells of Comparative Examples 5 and 6 were as low as 50% and 40%, respectively.

This can be explained as follows. If the diethyl carbonate is equal to or less than 5 vol %, this small amount of added diethyl carbonate cannot sufficiently inhibit the decomposition of the methyl ethyl carbonate, failing to improve the cycle capacity retention rate. In the case of the content being equal to or higher than 35 vol %, this amount is excessive for the diethyl carbonate, which is more viscous than methyl ethyl carbonate, so that the electrode plates become less readily impregnated with the electrolyte and the contact between the electrolyte and the electrode plates becomes poor. As a result, the load capacity retention rate and low-temperature capacity retention rate deteriorate.

The test results of the cells of Example 4 and Comparative Example 7, with titanium (Ti) added in place of zirconium, in comparison with those of the cells of Example 1 and Comparative Example 3 show that the use of titanium in place of zirconium provides preferable effects.

Also, the test results of the cells of Example 1 and Comparative Example 3 compared with those of the cells of Example 5 and Comparative Example 8, in which propylene carbonate (PC) was used in addition to ethylene carbonate (EC), and compared with those of the cells of Example 6 and Comparative Example 9, in which dimethyl carbonate (DMC) was used instead of methyl ethyl carbonate (MEC), show that the use of PC and DMC provides similar preferable effects.

The cells of Example 5 and Comparative Example 8, in which propylene carbonate (PC) was added, were superior to the cells of Example 1 and Comparative Example 3 in the low-temperature capacity retention rate. This is considered to be due to the fact that propylene carbonate has a lower melting point than ethylene carbonate, which provided a lower viscosity at low temperatures.

The cells of Examples 7 to 9, which used magnesium (Mg) and aluminum (Al) in addition to zirconium and/or titanium, showed results preferably comparable to those of the cells of Examples 1 and 4, in which zirconium or titanium was added. Moreover, the addition of magnesium and the like to the positive electrode drastically improves the thermal stability of the lithium cobalt oxide, and thus is preferred.

Examples 10 to 12, Comparative Examples 10 and 11

Cells were prepared in the same manner as in Example 1 and Comparative Example 3, except that the amounts of the electrolyte per one gram of the positive electrode active material were varied as shown in Table 2. These cells were subjected to the same experiment as Experiment 1 above in order to check their cell characteristics. The results are listed in Table 2.

TABLE 2

| | element added (mol %) | non-aqueous solvent (volume ratio) | amt of electrolytic solution (ml/g) | load characteristics | | low-temp. characteristics | | cycle characteristics | |
|---|---|---|---|---|---|---|---|---|---|
| | | | | capacity retention rate (%) | avg. voltage (V) | capacity retention rate (%) | avg. voltage (V) | capacity retention rate (%) | avg. voltage (V) |
| C.E.3 | Zr: 0.2 | EC:MEC = 30:70 | 0.32 | 70 | 3.60 | 35 | 3.20 | 50 | 3.48 |
| C.E 10 | Zr: 0.2 | EC:MEC = 30:70 | 0.31 | 70 | 3.60 | 35 | 3.20 | 28 | 3.25 |
| C.E 11 | Zr: 0.2 | EC:MEC = 30:70 | 0.30 | 70 | 3.60 | 35 | 3.20 | 13 | 3.17 |
| E.1 | Zr: 0.2 | EC:MEC:DEC = 30:50:20 | 0.32 | 65 | 3.58 | 31 | 3.17 | 87 | 3.65 |
| E.10 | Zr: 0.2 | EC:MEC:DEC = 30:50:20 | 0.30 | 65 | 3.58 | 30 | 3.17 | 88 | 3.65 |
| E.11 | Zr: 0.2 | EC:MEC:DEC = 30:50:20 | 0.29 | 65 | 3.57 | 30 | 3.16 | 88 | 3.65 |
| E.12 | Zr: 0.2 | EC:MEC:DEC = 30:50:20 | 0.28 | 65 | 3.57 | 28 | 3.15 | 87 | 3.65 |

Table 2 shows that the cells of Comparative Examples 3, 10, and 11, in which diethyl carbonate was not contained, had low cycle capacity retention rates, decreasing significantly from 50% to 13% as the amount of the electrolyte decreased. On the contrary, the cycle capacity retention rates of the cells of Examples 10 to 12, 87% and 88%, were preferably comparable with each other.

Thus, the advantageous effects of the present invention realized by including diethyl carbonate (DEC) at a predetermined amount become especially notable when there is a high density of the positive electrode active material such that the amount of the electrolyte per one gram of the positive electrode active material is equal to or less than 0.32 ml, and when the amount of the electrolyte is small. In other words, with the positive electrode active material highly dense and the electrolyte provided in a small amount, higher cell capacity is achieved. Thus, from the viewpoint of the volume energy density of a cell, it is preferable that the amount of the electrolyte per one gram of the positive electrode active material be equal to or less than 0.31 ml, more preferably, equal to or less than 0.30 ml, and particularly preferably, equal to or less than 0.28 ml.

Supplementary Remarks

While in the above Examples the outer casings are square or rectangular, it will be appreciated that the casings can be cylindrical, coin-shaped, button-shaped, laminate-shaped, or the like. Also, the present invention is applicable to cells using the polymer electrolyte.

While in the above Examples the magnesium and aluminum are added in combination, each can be added alone, in which case, also, the cycle capacity retention rate has been confirmed to improve.

While in the above Examples the cyclic carbonate and the open chain carbonate are mixed at a volume ratio of 30:70, this ratio is not to be restrictive. For sufficient ion solubility and ion conductivity, the volume ratio of the solvent of high permittivity (cyclic carbonate) and the solvent of low viscosity (open chain carbonate) is preferably between 30:70 and 50:50.

The non-aqueous solvent is not to be limited to the one used in the above Examples. As the highly permittive solvent, cyclic carbonates such as butylene carbonate and vinylene carbonate, lactones such as γ-butyrolactone, and sulfolane can be used. As the low viscous solvent, esters such as methyl acetate and ethyl acetate, ketones such as cyclopentanone, open chain carbonates such as methyl propyl carbonate, and ethers such as tetrahydrofuran, dioxolane, and 1,2-dimethoxyethane are contemplated. The foregoing can be used alone or in combination. For excellent charge and discharge characteristics, nevertheless, it is preferable to mix a cyclic carbonate with diethyl carbonate, and dimethyl carbonate and/or methyl ethyl carbonate.

The ratio of a different metal element to the lithium cobalt oxide is preferably 0.01 mol % to 1 mol % for zirconium and titanium, and 0.01 mol % to 3 mol % for magnesium and aluminum. If the content of the different metal element is below the specified lowest limits, the desired effects cannot be obtained, while if the content exceeds the specified highest limits the cell capacity can be decreased following the reduction of lithium cobalt oxide, which serves as an active material.

The method of adding a metal element different from cobalt is not limited to coprecipitation; for instance, the metal element different from cobalt can be added by mixing particles containing the cobalt and particles containing the metal element different from cobalt. Still, coprecipitation is preferred in that by this method the cobalt and a different metal element are uniformly mixed. It should be noted that in this specification the lithium cobalt oxides to which a metal element different from cobalt is added are collectively referred to as different-element-added lithium cobalt oxides (e.g., zirconium-added lithium cobalt oxide).

Examples of the electrolyte salt other than $LiPF_6$ include $LiN(C_2F_5SO_2)_2$, $LiSO_2(C_2F_5)_2CF_3$, $LiN(CF_3SO_2)_2$, $LiCF_3SO_3$, $LiClO_4$, $LiBF_4$, $LiAsF_6$. The foregoing can be used alone or in combination. The amount of the foregoing dissolved in the non-aqueous solvent is preferably 0.5 mol/l to 2.0 mol/l.

While in the above Examples the slurry was applied with a doctor blade, a die coater or roller coating may perform this task. Using an aluminum mesh provides preferable results similar to when using an aluminum foil.

What is claimed is:

1. A non-aqueous electrolyte secondary cell comprising:
a negative electrode;
a positive electrode having a positive electrode active material containing a lithium cobalt oxide, the lithium cobalt oxide having added one or more elements different from cobalt thereto and being calcined; and
a non-aqueous electrolyte containing a non-aqueous solvent and an electrolyte salt,
wherein the non-aqueous solvent contains open-chain carbonates, the open-chain carbonates comprising diethyl carbonate at 10 to 30 volume percent of the total volume of the non-aqueous solvent on a base of 25 degrees Celsius and an open-chain carbonate containing a methyl group; and
the one or more elements different from cobalt are either Ti or Zr, or both Ti and Zr.

2. The non-aqueous electrolyte secondary cell according to claim 1, wherein the one or more elements different from cobalt include Mg in addition to either Ti or Zr, or both Ti and Zr.

3. The non-aqueous electrolyte secondary cell according to claim 1, wherein the amount of the electrolyte is equal to or less than 0.32 ml per one gram of the positive electrode active material.

4. The non-aqueous electrolyte secondary cell according to claim 2, wherein the amount of the electrolyte is equal to or less than 0.32 ml per one gram of the positive electrode active material.

5. The non-aqueous electrolyte secondary cell according to claim 1, wherein the one or more elements different from cobalt include Al in addition to either Ti or Zr, or both Ti and Zr.

6. The non-aqueous electrolyte secondary cell according to claim 1, wherein the one or more elements different from cobalt are Zr, Mg and Al.

7. The non-aqueous electrolyte secondary cell according to claim 1, wherein the one or more elements different from cobalt are Ti, Mg and Al.

8. The non-aqueous electrolyte secondary cell according to claim 1, wherein the one or more elements different from cobalt are Ti, Zr, Mg and Al.

9. The non-aqueous electrolyte secondary cell according to claim 5, wherein the amount of the electrolyte is equal to or less than 0.32 ml per one gram of the positive electrode active material.

10. The non-aqueous electrolyte secondary cell according to claim 6, wherein the amount of the electrolyte is equal to or less than 0.32 ml per one gram of the positive electrode active material.

11. The non-aqueous electrolyte secondary cell according to claim 7, wherein the amount of the electrolyte is equal to or less than 0.32 ml per one gram of the positive electrode active material.

12. The non-aqueous electrolyte secondary cell according to claim 8, wherein the amount of the electrolyte is equal to or less than 0.32 ml per one gram of the positive electrode active material.

13. A method for fabricating a non-aqueous electrolyte secondary cell comprising a negative electrode; a positive electrode having a positive electrode active material containing a lithium cobalt oxide, the lithium cobalt oxide having added one or more elements different from cobalt thereto; and a non-aqueous electrolyte containing an electrolyte salt and a non-aqueous solvent that contains diethyl carbonate at 10 to 30 volume percent on a base of 25 Celsius,
wherein the method comprises:
a first step of preparing a coprecipitate of cobalt and the one or more elements different from cobalt selected from either Ti or Zr, or both Ti and Zr;
a second step of preparing tricobalt tetraoxide having added the one or more elements different from cobalt thereto by a thermal decomposition reaction of the coprecipitate; and
a third step of preparing the lithium cobalt oxide having added one or more elements different from cobalt thereto by mixing and calcining the tricobalt tetraoxide and lithium carbonate.

14. The method for fabricating a non-aqueous electrolyte secondary cell according to claim 13, wherein the amount of the electrolyte is equal to or less than 0.32 ml per one gram of the positive electrode active material.

15. The method for fabricating non-aqueous electrolyte secondary cell according to claim 13, wherein the one or more elements different from cobalt include Mg in addition to either Ti or Zr, or both Ti and Zr.

16. The method for fabricating non-aqueous electrolyte secondary cell according to claim 15, wherein the amount of the electrolyte is equal to or less than 0.32 ml per one gram of the positive electrode active material.

17. The method for fabricating non-aqueous electrolyte secondary cell according to claim 13, wherein the one or more elements different from cobalt are Zr, Mg and Al.

18. The method for fabricating non-aqueous electrolyte secondary cell according to claim 13, wherein the one or more elements different from cobalt are Ti, Mg and Al.

19. The method for fabricating non-aqueous electrolyte secondary cell according to claim 13, wherein the one or more elements different from cobalt are Ti, Zr, Mg and Al.

20. The method for fabricating non-aqueous electrolyte secondary cell according to claim 17, wherein the amount of the electrolyte is equal to or less than 0.32 ml per one gram of the positive electrode active material.

21. The method for fabricating non-aqueous electrolyte secondary cell according to claim 18, wherein the amount of the electrolyte is equal to or less than 0.32 ml per one gram of the positive electrode active material.

22. The method for fabricating non-aqueous electrolyte secondary cell according to claim 19, wherein the amount of the electrolyte is equal to or less than 0.32 ml per one gram of the positive electrode active material.

23. The non-aqueous electrolyte secondary cell according to claim 1, wherein the open-chain carbonate containing a methyl group is at least one selected from the group consisting of dimethyl carbonate and methyl ethyl carbonate.

24. The non-aqueous electrolyte secondary cell according to claim 1, wherein the open-chain carbonates are contained at 50 to 70 vol % of the total volume of the non-aqueous solvent.

25. The non-aqueous electrolyte secondary cell according to claim 1, wherein the non-aqueous solvent contains a cyclic carbonate.

26. The non-aqueous electrolyte secondary cell according to claim 24, wherein the volume ratio of the solvent of the cyclic carbonate and the open-chain carbonates is between 30:70 and 50:50 on a base of 25 degrees Celsius.

27. The non-aqueous electrolyte secondary cell according to claim 1, wherein the negative electrode has a negative electrode active material containing graphite.

* * * * *

UNITED STATES PATENT AND TRADEMARK OFFICE
CERTIFICATE OF CORRECTION

PATENT NO. : 7,939,207 B2
APPLICATION NO. : 11/010384
DATED : May 10, 2011
INVENTOR(S) : Nobumichi Nishida et al.

It is certified that error appears in the above-identified patent and that said Letters Patent is hereby corrected as shown below:

In the Claims:

In claim 13, column 12, line 2:

Change "25 Celsius"

To be

--25 degrees Celsius, and an open-chain carbonate containing a methyl group--

Signed and Sealed this
Fourteenth Day of May, 2013

Teresa Stanek Rea
*Acting Director of the United States Patent and Trademark Office*